Figure 4:
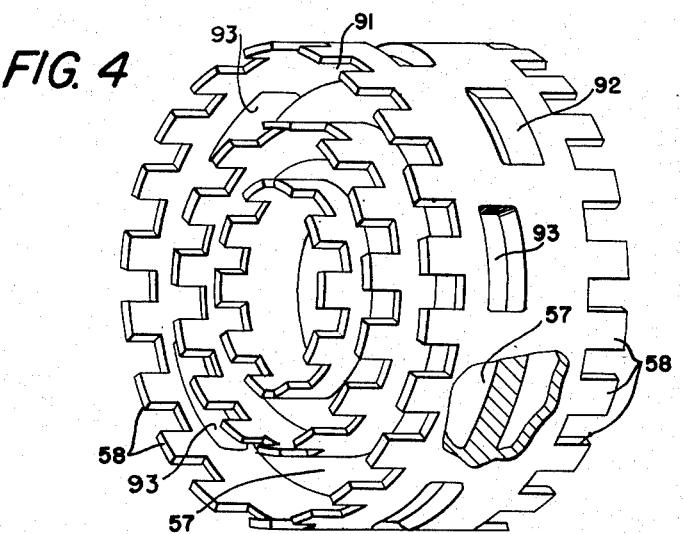

Feb. 3, 1953  G. A. SPENCER  2,627,394
RUBBER FOAM MIXER
Filed Oct. 4, 1951  3 Sheets-Sheet 1
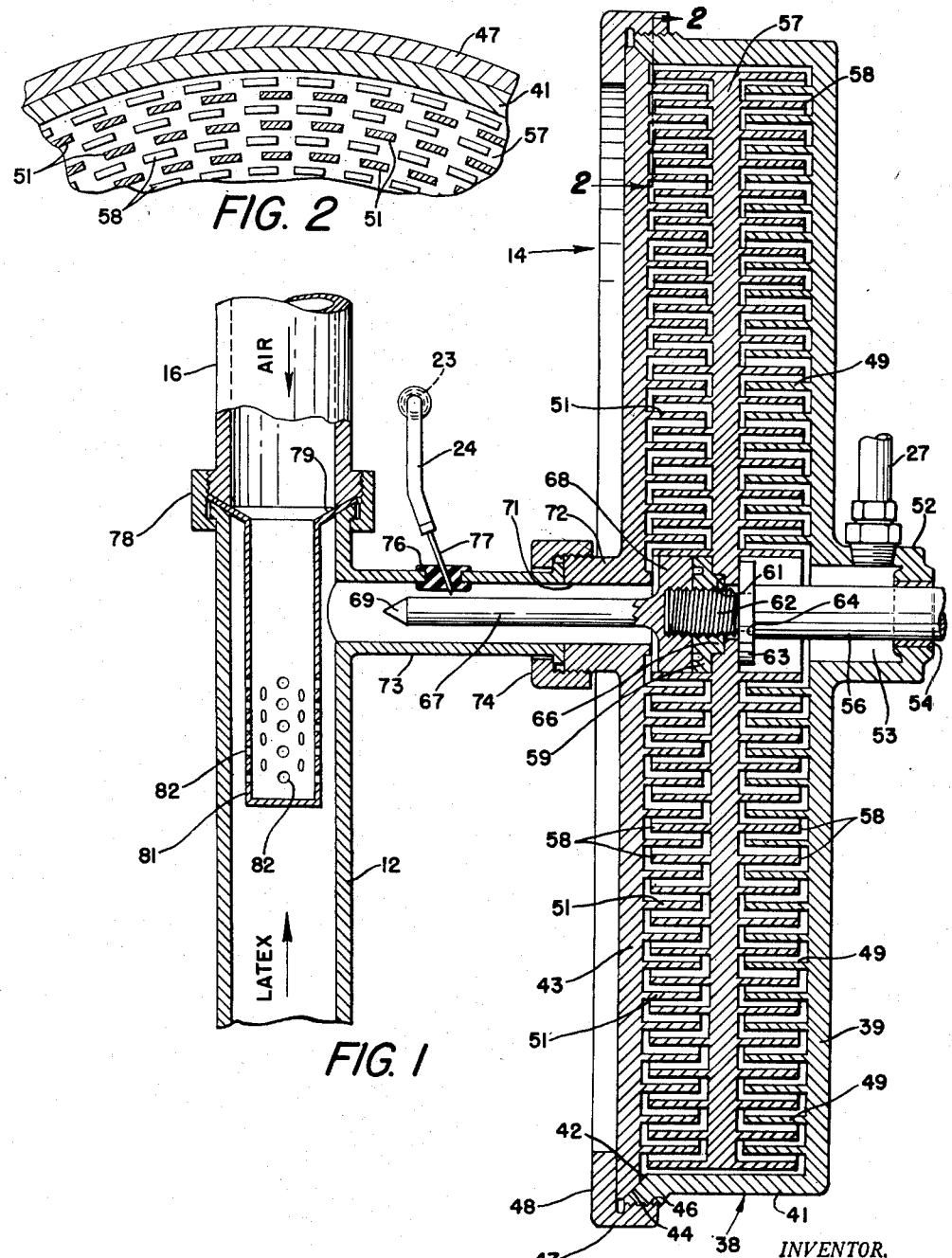
INVENTOR.
GEORGE A. SPENCER
BY
Ely Frye
ATTORNEYS Feb. 3, 1953  G. A. SPENCER  2,627,394
RUBBER FOAM MIXER
Filed Oct. 4, 1951  3 Sheets-Sheet 2

INVENTOR.
GEORGE A. SPENCER
BY
*Elys Frye*
ATTORNEYS

UNITED STATES PATENT OFFICE 2,627,394

RUBBER FOAM MIXER

George A. Spencer, Akron, Ohio, assignor to The Firestone Tire & Rubber Company, Akron, Ohio, a corporation of Ohio Application October 4, 1951, Serial No. 249,706

14 Claims. (Cl. 259—9)

This invention relates to a mixer for foam rubber. According to current methods of foaming rubber, a continuous stream of latex is mixed with air and a gelling agent, and passed through a beater comprising a drum having a labyrinth of rotors and stators through which the foam courses radially outwardly and inwardly, and is reduced to a fine emulsion. One of the chief problems in this process is the occurrence of what is known as "blow-by" wherein large gobs of air evade intimate mixture and pass on through the system, with resultant lack of fineness and uniformity in the product. It is, therefore, a principal object of the invention to eliminate "blow-by."

Conventional mixers have been constructed with the rotor shaft journaled in the mixer housing on both sides of the rotor. In this arrangement latex had to be fed into the mixer at a location offset from the rotor axis. In this system, "blow-by" was pronounced and it was necessary to run the foam through two mixers in succession to abate the difficulty in reasonable degree. According to the invention, the rotor is mounted cantilever fashion, enabling axial feed and consequently reduction of "blow-by." It is, therefore, a more particular object of the invention to provide for axial feed of foam into a mixer. Other objects are to correlate axial feed with proper air-mixing and introduction of gelling agents. As a feature of this correlation, an axial torpedo head is provided on the rotor, outboard of the rotor in proximity to the mixing device.

Figure 3:
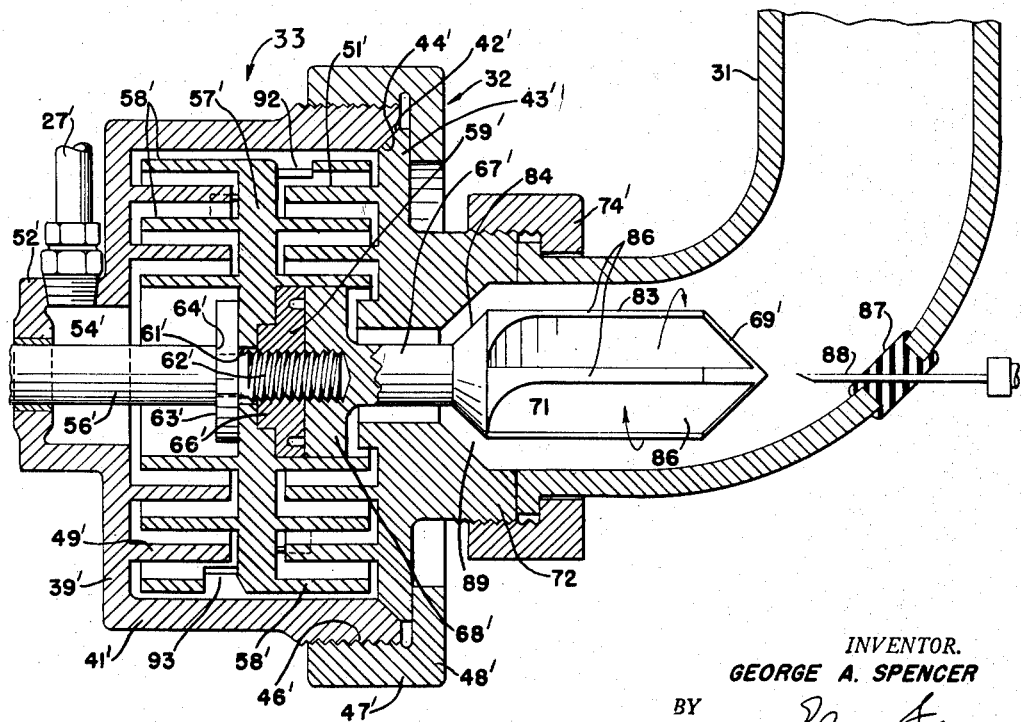
Figure 5:
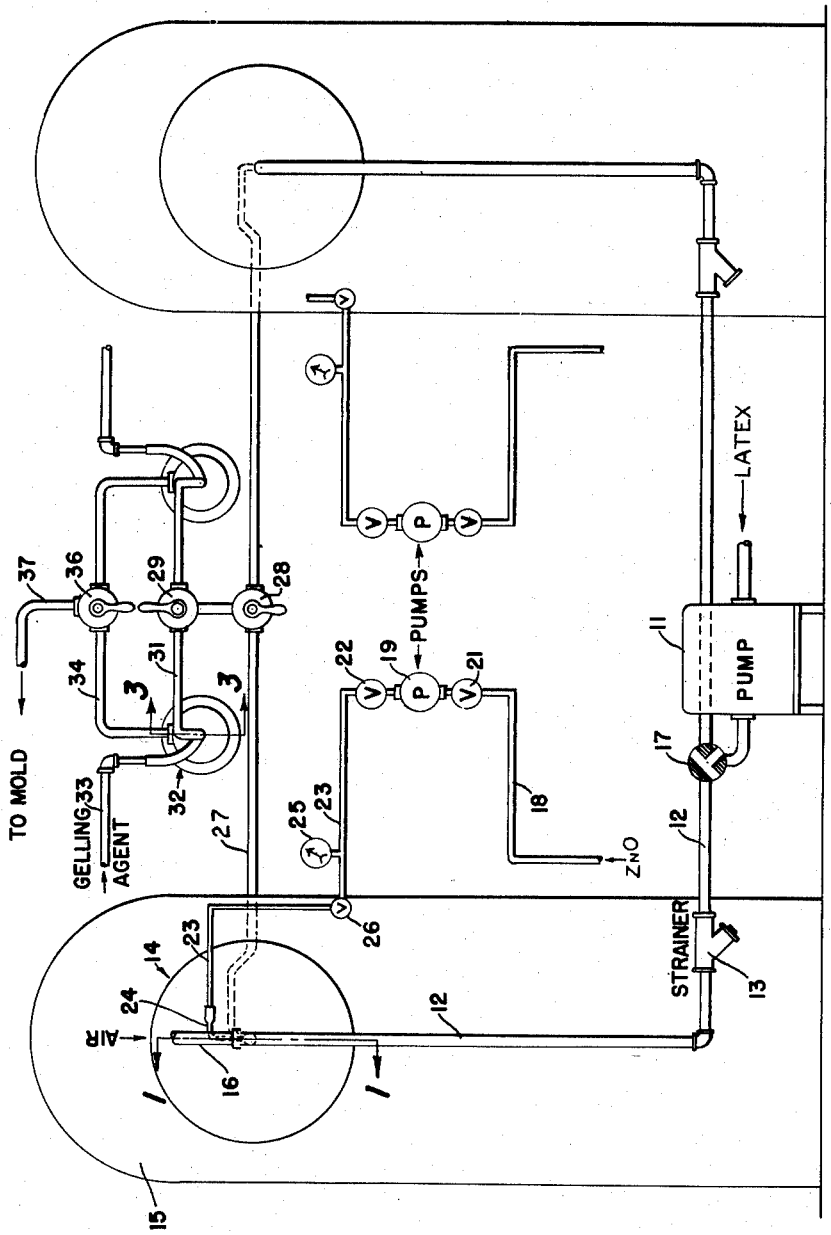

The invention is described in detail in the accompanying specification, as illustrated in the drawings, in which:

Fig. 1 is an axial, sectional view of a mixer and a feed line having an air disperser, as seen on the line 1—1 of Fig. 5, Fig. 2 is a view taken on the line 2—2 of Fig. 1, Fig. 3 is an axial, sectional view of a modified mixer, as seen on the line 3—3 of Fig. 5, Fig. 4 is a perspective view, partly broken away, of the rotor of the Fig. 3 mixer, and Fig. 5 is a schematic view showing the mixer layout.

The system shown in Fig. 5 comprises duplicate units on each side of a median, vertical line, which units may be put in service alternately, so that production is not interrupted during periods of cleaning or repair. Therefore, only one side of the system need be described. A pump 11 forces latex from a suitable vat (not shown) through a pipe line 12, including a strainer 13, to a mixing unit 14 supported on a housing 15. A line 16 is connected to line 12 at the mixer to introduce air under pressure. A motor (not shown) for driving the rotor of unit 14 is enclosed in housing 15. A valve 17 permits reversing the feed from one side of the system to the other, or shutting it off.

Zinc oxide, which, besides its usual function as an accelerator of vulcanization, also assists in the gelling of the foam, is drawn from a supply (not shown) through a pipe 18 by a pump 19 equipped with valves 21, 22, and forced through a line 23 with a flexible hose 24 to a point in feed line 12 adjacent mixer 14. The flow of zinc oxide is indicated by a gage 25, and a cut-off valve 26 is provided between the gage and the mixer.

The beaten foam passes from mixer 14 into a line 27, thence through reversing valves 28, 29 in succession, and through a line 31 to a second, smaller mixer 32. At mixer 32 a gelling agent, sodium silica fluoride, is introduced into the foam through a line 33 leading from a source of supply (not shown). The foam leaves mixer 32 through a line 34, thence through a reversing valve 36 and a line 37 to the station where the foam is squirted into the molds.

The mixer 14 is shown in detail in Fig. 1. This includes a stator housing having a drum-shaped portion 38 with base wall 39 and a ring-form flange 41. The outer edge of flange 41 is beveled on the inner corner at 42 to receive, in mating relation, a cover plate 43 having a similarly beveled, inner corner 44. Flange 41 is exteriorly threaded at 46 to receive an interiorly threaded ring 47 having a flange 48 overlapping cover 43 and securing the cover in liquid-sealing relation on the drum.

The interior surface of base 39 of the drum is provided with stator blades in the form of arcuate segments 49, integral with the base, and arranged in a series of circles concentric with the axis of the drum. A series of similar arcuate segments 51, integral with cover 43, are also arranged on concentric circles which are aligned with the respective circles of segments 49.

The drum 38, which is suitably supported on housing 15 in any convenient manner, has a hub 52 defining an outlet chamber 53, and the outlet pipe 27 is threaded in an opening in the hub. The hub also has an axial opening provided with packing 54 through which the rotor shaft 56 passes.

The rotor comprises a circular disk 57 having on each face protruding, integral, arcuate segments 58 arranged in concentric circles and located so as to extend between the stator segments 49 and 51 on the housing.

A headed nut 59 provided with spanner holes, which is received in a central opening 61 of the rotor, is internally threaded for reception on the threaded, reduced end 62 of shaft 56. A washer 63 abuts a shoulder 64 on the shaft and thus serves to properly locate the rotor axially of the stator blades. The head 66 of nut 59 clamps the rotor against washer 63.

Also threaded on end 62 of the shaft is a cylindrical torpedo head 67 having a base 68 with threaded axial bore, and a conical, outer end 69. The torpedo extends through an axial opening 71 in a hub 72 of housing cover 43, in spaced relation thereto. The latex supply tube 12 has a branch passage 73 axially aligned with and abutting hub 72, to which it is secured by a union 74. A rubber grommet 76, secured in an opening in branch 73, holds a needle 77 through which zinc oxide from line 23 is introduced into the latex-air mixture.

Pipes 12 and 16 are joined by a union 78, and between the pipe ends is clamped the frusto-conical flange 79 of a tube 81 having perforations 82 in its side walls in a zone preferably below the line of branch 73. The air must pass through perforations 82 before contacting the latex. In this passage, the air is uniformly dispersed in the latex radially of the tube and is rendered turbulent, and an intimate mixing of air and latex results prior to entry into branch 73. At a point slightly within branch 73, the stream of aerated latex is cleaved by head 69 of the torpedo, so as to diverge uniformly outwardly of the torpedo axis. It is thus conditioned for uniform, radial spreading when it enters mixer housing 38, since the tubular form of the stream persists as it moves along the rotating torpedo. At a point just beyond head 69 of the torpedo, the zinc oxide is added in metered amounts through needle 77.

Within the mixer 38, the latex-air-ZnO mixture progresses through the labyrinth of baffles radially outwardly of the mixer and is thoroughly churned at the same time, with the result that the air bubbles are reduced to a minute size while retaining a uniform degree of dispersion. After reaching the outer wall 41 of the mixer, the foam is urged back toward the mixer axis by the line pressure, and in this passage the beating of the foam is continued. Finally, the foam reaches chamber 53 and moves out through line 27, to pass to the second mixer 32, shown in detail in Figs. 3 and 4, the purpose of which is to disperse the gelling agent while maintaining the fine and uniform condition of the foam. Mixer 32, although of considerably reduced size, is generally similar to mixer 14 and corresponding parts have therefore been indicated by similar reference numerals, qualified by prime marks.

Other than its size, the chief difference in mixer 32 is in the form of the torpedo. In the modified form, the torpedo has an enlarged head 83 joined to the shank 67' by a tapered shoulder 84. Head 83 has a conical tip 69' and is milled to provide four vanes 86. A grommet 87 holds a needle 88 through which the gelling agent is introduced, the needle being aligned with the axis of the torpedo and the needle point being closely adjacent the apex of the cone 69'. The enlarged form of torpedo head and the twisting imparted by the vanes have been found to be very effective in properly mixing the gelling agent. It is equally important that the foam be again restricted to a tube of small radius (by passage 89 adjacent tapered shoulder 84), so that the degree of dispersion is not lowered, and the stream is as near the axis as possible when it enters the rotor housing.

Another difference in the smaller mixer lies in the fact that the spaces 91 between the rotor segments do not extend to the rotor disc 57' but only about half way thereto. This produced better foam, but for reasons unknown. It was also found that the product was improved by providing by-pass openings 92, 93, in the outer wall of the rotor. The effect of these ports seems to be a re-mixing, which blends out "pulse" effects due to "pulse" feeding of the gelling agent through the injector. These ports may also be provided on the inner circles of the rotor.

By the means shown and described, "blow-by" has been minimized in foamers by thoroughly mixing the air and latex and, thereafter, promptly presenting the stream of foam to a streamlining device in the form of a torpedo which maintains the flow in a tubular path of small radius, so that air and latex do not segregate, and introduces the foam into the mixer adjacent the axis thereof, and in a condition of symmetry with respect to said axis. By suitable modification this system has been shown to have additional utility in a mixer associated with introduction of a gelling agent.

While certain preferred embodiments have been shown and described, the invention is not limited thereto, since modifications are possible within the spirit and scope of the appended claims.

What is claimed is:

1. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, and a free-ended extension on said shaft extending within said opening and radially spaced from the walls thereof.

2. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, and a free-ended extension on said shaft extending within said opening and radially spaced from the walls thereof.

3. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, and a free-ended extension on said shaft extending within said opening and radially spaced from the walls thereof, said extension being cylindrical and having an end of converging width.

4. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, and a free-ended extension on said shaft extending within said opening and radially spaced from the walls thereof, said extension being cylindrical and having a conical end.

5. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, and a free-ended extension on said shaft extending within said opening and radially spaced from the walls thereof, said extension being cylindrical and having an enlarged, outer head.

6. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, and a free-ended extension on said shaft extending within said opening and radially spaced from the walls thereof, said extension being cylindrical and having an enlarged, outer head with a conical end.

7. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, and a free-ended extension on said shaft extending within said opening and radially spaced from the walls thereof, said extension being cylindrical and having an enlarged, outer head with radial vanes parallel to its axis.

8. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, and a free-ended extension on said shaft extending within said opening and radially spaced from the walls thereof, said extension being cylindrical and having an enlarged, outer head with a conical point, and said head having radial vanes parallel to its axis.

9. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, a free-ended extension on said shaft extending within said opening and radially spaced from the walls thereof, said extension being cylindrical and having an enlarged, outer head with a conical point, and said head having radial vanes parallel to its axis, conduit means for introducing fluid material into said opening, and injection means for a gelling agent passing through said conduit means and having its inner, outlet end closely adjacent the apex of said conical end.

10. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, a free-ended extension on said shaft extending within said opening and radially spaced from the walls thereof, a first conduit for introducing fluid material into said opening, a second conduit communicating with said first conduit, and a perforated wall between said first and second conduits.

11. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, a free-ended extension on said shaft extending within said opening and radially spaced from the walls thereof, a T-form conduit having one arm communicating with said opening, and a tube having perforated walls held in the other arm of said conduit and adjacent said one arm.

12. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, and a free-ended extension on said shaft extending within said opening and radially spaced from the walls thereof, said rotor blade comprising a central disc with a perpendicular, circular wall having serrations in its outer edge, the bottoms of said serrations located medially of the extent of said walls.

13. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, and a free-ended extension on said shaft extending within said opening and radially spaced from the walls thereof, said rotor blade comprising a central disc with a perpendicular, circular wall, and said wall having apertures.

14. A foaming mixer comprising a housing having a discharge opening and circularly arranged stator blades, a shaft arranged axially of said stator blades, a rotor secured to said shaft and having blades arranged for co-operation with said stator blades, means defining a tubular inlet opening arranged co-axially of said shaft for feeding material into said housing, and a free-ended extension on said shaft extending within said opening and radially spaced from the walls thereof, said rotor blade comprising a central disc with a perpendicular, circular wall having serrations in its outer edge, the bottoms of said serrations located medially of the extent of said walls, and said wall having apertures in the region between the bottoms of said serrations and said disc.

GEORGE A. SPENCER.

REFERENCES CITED

The following references are of record in the file of this patent:

UNITED STATES PATENTS

| Number | Name | Date |
| --- | --- | --- |
| 956,065 | Fleming | Apr. 26, 1910 |
| 1,670,593 | Miller | May 22, 1928 |
| 1,739,360 | Hopkins | Dec. 10, 1929 |
| 2,313,760 | McLean | Mar. 16, 1943 |
| 2,328,950 | Brant | Sept. 7, 1943 |
| 2,389,486 | Colony | Nov. 20, 1945 |